United States Patent [19]
Dagenhart et al.

[11] 4,434,131
[45] Feb. 28, 1984

[54] NEUTRAL BEAMLINE WITH IMPROVED ION ENERGY RECOVERY

[75] Inventors: William K. Dagenhart, Oak Ridge; Halsey H. Haselton, Knoxville; William L. Stirling; John H. Whealton, both of Oak Ridge, all of Tenn.

[73] Assignee: The United States of America as represented by the United States Department of Energy, Washington, D.C.

[21] Appl. No.: 253,641

[22] Filed: Apr. 13, 1981

[51] Int. Cl.³ ............................................. G21B 1/00
[52] U.S. Cl. ................................. 376/130; 376/147; 250/251
[58] Field of Search ............... 376/130, 147, 127, 129; 250/251, 396 ML; 313/424, 363.1; 315/111.3

[56] References Cited

U.S. PATENT DOCUMENTS

| | | | |
|---|---|---|---|
| 2,555,850 | 6/1951 | Glyptis | 313/424 |
| 2,617,060 | 11/1952 | DeGier | 313/424 |
| 2,617,061 | 11/1952 | DeGier | 313/424 |
| 3,030,543 | 4/1962 | Luce | 376/127 |
| 3,617,789 | 11/1971 | Middleton et al. | 376/129 |
| 3,663,360 | 5/1972 | Post . | |
| 3,668,065 | 6/1972 | Moir . | |
| 3,713,967 | 1/1973 | Hamilton et al. . | |
| 4,349,505 | 9/1982 | Stirling | 376/130 |

OTHER PUBLICATIONS

Nuclear Instruments and Methods, vol. 135, No. 2, Jun. 1976, pp. 203–209, Fumelli et al.
EUR-CEA-FC-823, 7/76, Association Euratom–CEA, France, P. Raimbault.
Proc. 7th Symp. on Eng. Prob. of Fusion Research, 1978, vol. 1, pp. 308–314, Barr et al.
Applied Physics Letters, 7/15/79, vol. 35(2) pp. 104–106, Stirling et al.
Proc. of 6th Symp. on Eng. Prob. of Fusion Research, San Diego, Calif. 1975, pp. 184–190, Bender et al.

*Primary Examiner*—Harvey E. Behrend
*Attorney, Agent, or Firm*—David E. Breeden; Stephen D. Hamel

[57] ABSTRACT

A neutral beamline generator with unneutralized ion energy recovery is provided which enhances the energy recovery of the full energy ion component of the beam exiting the neutralizer cell of the beamline. The unneutralized full energy ions exiting the neutralizer are deflected from the beam path and the electrons in the cell are blocked by a magnetic field applied transverse to the beamline in the cell exit region. The ions, which are generated at essentially ground potential and accelerated through the neutralizer cell by a negative acceleration voltage, are collected at ground potential. A neutralizer cell exit end region is provided which allows the magnetic and electric fields acting on the exiting ions to be closely coupled. As a result, the fractional energy ions exiting the cell with the full energy ions are reflected back into the gas cell. Thus, the fractional energy ions do not detract from the energy recovery efficiency of full energy ions exiting the cell which can reach the ground potential interior surfaces of the beamline housing.

5 Claims, 4 Drawing Figures

NEUTRAL BEAMLINE WITH IMPROVED ION ENERGY RECOVERY

BACKGROUND OF THE INVENTION

This invention relates generally to neutral beam injection systems for use in controlled fusion devices such as the tokamaks, magnetic mirror systems, bumpy tori and the like, and more particularly, this invention relates to improvements in neutral beam injectors with direct ion energy recovery.

In the field of controlled fusion, or controlled thermonuclear reaction, a high temperature plasma is formed of light isotope ions whose nuclei are fusionable and which are contained within a magnetic field confinement, or containment zone, in an evacuated region. Such light isotopic species may generally comprise one or more materials, such as hydrogen, deuterium, tritium, helium 3 etc., whose nuclei undergo fusion reactions under appropriate conditions of confinement time, density, and temperature. These conditions may be brought about or supplemented by the injection of properly accelerated neutral particle beams of one or more of the appropriate species on the proper trajectory with respect to the magnetic field. A portion of the energetic neutral particles are ionized by collision with neutral or charged particles and are accordingly trapped by the magnetic field to form a high temperature plasma. The injected particles must be neutral in order to penetrate the very strong magnetic-field-contained plasma.

Since the neutral particles cannot be directy accelerated to high velocity, i.e., high kinetic energies, they are produced in an indirect manner from an ion source. The neutral beam may be produced by accelerating either positively or negatively charged ion, of one or more of the above species, emerging from an ion source and then passing the charged particles through a gas-cell neutralizer wherein they interact with neutral atoms and molecules of the neutralizer gas at a specified pressure through charge exchange. A portion of the ions are neutralized and emerge from the neutralizer as high energy neutral particles along with the accelerated beam passing therethrough. The beams are generated and manipulated in a vacuum chamber whose pressure is maintained at the selected pressure level by a cryo-pumping system.

Since the beam emerging from the neutralizer also contains electrons and unneutralized ions, some means must be provided to separate the neutral particles from the electrons aned ions to obtain the desired neutral beam for injection into the magnetically confined plasma. This is accomplished by either electrostatic or magnetic field blocking of the electrons, and diversion or bending of the positively charged ions from the primary beam path direction to allow the neutral beam to continue along the accelerated beam path. Depending upon the species and energy of the initially ionized particles of the beam, the neutral particle beam emerging from the neutralizer contains a large portion of high-energy unneutralized ions. Present ion sources operating at energies of about 40 kilo-electron volts (keV) per nucleon at 60 amps ion current provide about a 60% conversion efficiency in the neutralizer cell. As future ion sources ae developed toward energies of about 100 keV, or higher, per nucleon, at comparable current levels, the conversion efficiency drops to about 13% for hydrogen neutrals using $H_2$ gas and about 52% for deuterium nuetrals using $D_2$ gas, which represents an intolerable energy loss.

Therefore, in order to produce neutral beams for fusion plasma heating efficiently, the energy contained in the unneutralized fraction of the beam must be recovered. In order to recover the kinetic energy of the charged ion component of the beam emerging from the neutralizer cell, in the form of usable electric energy, the electrons present in the beam must be blocked and the beam ions diverted from the neutral beamline, decelerated and collected. The electrons must be blocked from entering the ion collector area since they would be accelerated into the ion collector thereby producing an energy loss which may be equal to or greater than the recovered ion energy.

In the process of developing direct energy recovery in neutral beam injectors, various means have been devised or suggested, which may be generally divided into two groups, depending upon the ion-deflection method used. They are either electrostatic or magnetic ion-deflection methods.

An electrostatic deflection system is described in "Proceedings of 7th Symposium on Engineering Problems of Fusion Research," 1978, by W. L. Barr et al, Vol. 1, page 308. This paper discloses an electrostatic system developed at Lawrence Livermore Laboratory, Livermore, Calif., in which the neutralizer cell wall is held at ground potential, the ion beam collector is biased highly positive (approximately 100 kV) and the electrons emerging from the cell are repelled by a negative voltage (approximately 20 kV) applied to the electrodes which closely encompass the beam. One negative electrode is placed between the neutralizer cell exit and a generally funnel-shaped ion collector which also emcompasses the beam. The other negative electrode is placed at the exit of the collector. The ion collector acts to decelerate and collect the ions diverging radially from the beam. The negative electrodes in this system must be biased sufficiently negative to drive the beam potential negative even on the axis in the presence of the positive-ion space charge and the nearby positive-ion collector. There are inherent problems with this system which include severe gas pressure requirements for efficient direct conversion, increased beamline length in order to establish the retarding electric field which consequently reduces the neutral power transmission efficiency and the need to hold a high positive potential on the ion collector in the presence of spatial and time-varying magnetic fields. The most critical gas-pressure requirement placed on this direct conversion system is imposed by the power load resulting from the acceleration and collection of the slow ions and electrons produced by ionization and charge exchange of the background gas. The resulting emission of secondary electrons at negative high voltage and the subsequent power drain must also be considered.

Other electrostatic electron-blocking and ion-deflection systems utilizing electrostatic grids which can intercept the beam are discussed by P. Raimbault in EUR-CEA-FE-823, 1976. One specific system outlined in this reference employs a cylindrical grid arrangement which surrounds the beam exiting the neutralizer which is biased negative with respect to the neutralizer to suppress the electrons. The ion collection method of this system has one advantage and one disadvantage compared to the Barr system mentioned above. The single advantage is that the ion collector is at ground potential. However, in addition to the other disadvantages to the Barr system, the Raimbault system also suffers from direct interception of the ion beam on the high negative potential, cylindrical grid. Not only is the ion energy lost, but secondary electrons ejected from the grid by the ion impingement constitute an additional power loss. In the proposed Raimbault system, the ion source is operated at near ground potential, and the ions are accelerated by operating the neutralizer at a high negative potential. The positive potential, at which the ion source is held above ground potential, is necessary to ensure that the unneutralized ions are able to reach the ion collector plate.

By operating the neutralizer at a negative potential to accelerate the ions from the source through the neutralizer makes it possible to recover the energy of the ions by deceleration to ground potential and eliminates the problems associated with a high positive potential deceleration voltage on an ion collector for recovery of their kinetic energy directly.

Further, as pointed out above, it has been suggested in the art to employ magnetic means for deflecting the ions from the accelerated beam, and it has been further suggested to employ magnetic suppression, or blocking, of the electrons in the beam emerging from the neutralizer tube. It has been recognized in the art that magnetic suppression would be advantageous in that the magnetic field can penetrate beams that are too thick and too dense for electrostatic suppression to work. However, in the prior-art experiments employing magnetic suppression, electrostatic fields also present in the system from positive potential deceleration ion collectors, have produced unnecessarily long beamlines and/or complicated electron motions which produce long-lived electrons in the system. Some of these electrons cause unwanted power drain or tend either to re-ionize the neutral beam exiting the neutralizer cell or de-ionize the positive ions directed to the energy recovery ion collectors.

A U.S. Pat. No. 4,349,505 of common assignee with the present invention, field July 1, 1980, by William L. Stirling for "Neutral Beamline With Ion Energy Recovery Based On Magnetic Blocking of Electrons" discloses a system employing magnetic blocking of the electrons and electron collection at the neutralizer exit. The neutralizer is operated at a high negative acceleration potential and the emerging beam experiences a strong electric field due to the surrounding ground potential structure which is transverse to the magnetic field applied across the beam at the neutralizer exit. Any electrons present in the beam from leakage or from secondary emission are quickly moved out of the beam due to E×B field drift and directed into a slightly positive biased, electron collector. However, molecular ions of the selected species extracted from the ion source along with the atomic ions are dissociated into atomic particles as they pass through the near-equilibrium gas cell. These particles have kinetic energies of fractional values with respect to the original full acceleration energy (E) of the atomic ions accelerated through the neutralizer and cannot reach the ground-potential surfaces on which the full energy (E) ions are collected. These fractional energy ions are deflected along paths of substantially smaller radius and tend to impinge upon the outer walls of the neutralizer cell producing undesirable secondary electrons outside of the electron collector region. These electrons are then accelerated to the surouding ground potential surfaces intended for the collection of the full energy ion's charge and detract from the energy recovery efficiency of the full energy ions.

Therefore, it will be appreciated that there is a need for improvements in neutral beamline systems with ion energy recovery based on the advantages of magnetic blocking of electrons and beam ion deflection which deals with the fractional energy ions exiting the neutralizer cell to prevent their interferring with the recovery of the energy from the full energy ions exiting the cell.

SUMMARY OF THE INVENTION

In view of the above need, it is an object of this invention to provide an improved neutral beamline for generating an energetic neutral beam with unneutralized ion energy recovery based on magnetic blocking of electrons in the ion beam neutralizer.

Another object of this invention is to provide an improved neutral beamline generator as in the above object wherein the energy recovery of unneutralized full energy ions is improved by blocking the exit of fractional energy ions from the beamline neutralizer cell.

Another object of this invention is to provide an improved neutral beamline system for high power applications in which the problems associated with energy disposal of the unneutralized portion of the beam are solved.

Another object of this invention is to provide an improved neutral beamline system as in the above objects which may be retrofit to existing neutral beam injectors thereby increasing their electrical efficiency and high-power, long-pulse capability.

Additional objects, advantages and features of the invention will be set forth in part in the description which follows, and will become apparent to those skilled in the art upon examination of the following or may be learned by practice of the invention. The objects and advantages of the invention may be realized and attained by means of the instrumentalities and combinations particularly pointed out in the appended claims.

To achieve the foregoing and other objects and in accordance with the purpose of the present invention, as embodied and broadly described herein, an improved neutral beamline generator is provided. Energy is recovered from full energy unneutralized ions exiting a neutralizer tube through which they are accelerated from a substantially operated ion source. In the neutralizer, a portion of the ions are converted to energetic neutral particles and exit the neutralizer. Residual full kinetic energy atomic ions and fractional kinetic energy atomic ions derived from molecular ions of the species accelerated into said neutralizer also exit the neutralizer. A magnetic field (B) is provided transverse to the beamline in a beam exit region of the neutralizer which has sufficient strength to block electrons from exiting the neutralizer and deflect the full energy ions from the beamline along a separate path. A nonmagnetic, electrically conductive ground potential structure defines the exit region of the neutralizer for providing a concentrated electric field within the exit region. The electric field is substantially transverse to the magnetic field and reflects the fractional energy ion component of the beam exiting the neutralizer back into the neutralizer. At least one ground potential full energy ion charge collector surface is provided in the path of the full energy ions deflected from the beamline outside the exit region formed by the structure. The full energy ions are decelerated and their charge collected on the ion collector. Thus, their energy is not expended.

The structure defining the exit region of the neutralizer has a downstream opening corresponding to the paths of the neutral beam and the full energy ion beam which is surrounded by an electron-collecting surface electrically biased sufficiently positive relative to the neutralizer tube for generating an electric field sufficient to collect the electrons drifting from the neutralizer exit region with a negligible energy loss.

BRIEF DESCRIPTION OF THE DRAWINGS

The accompanying drawings, which are incorporated in and form a part of the specification, illustrate the present invention and, together with the description, serve to explain the principles of the invention. In the drawings.

DETAILED DESCRIPTION OF THE DRAWINGS

Figure 1:
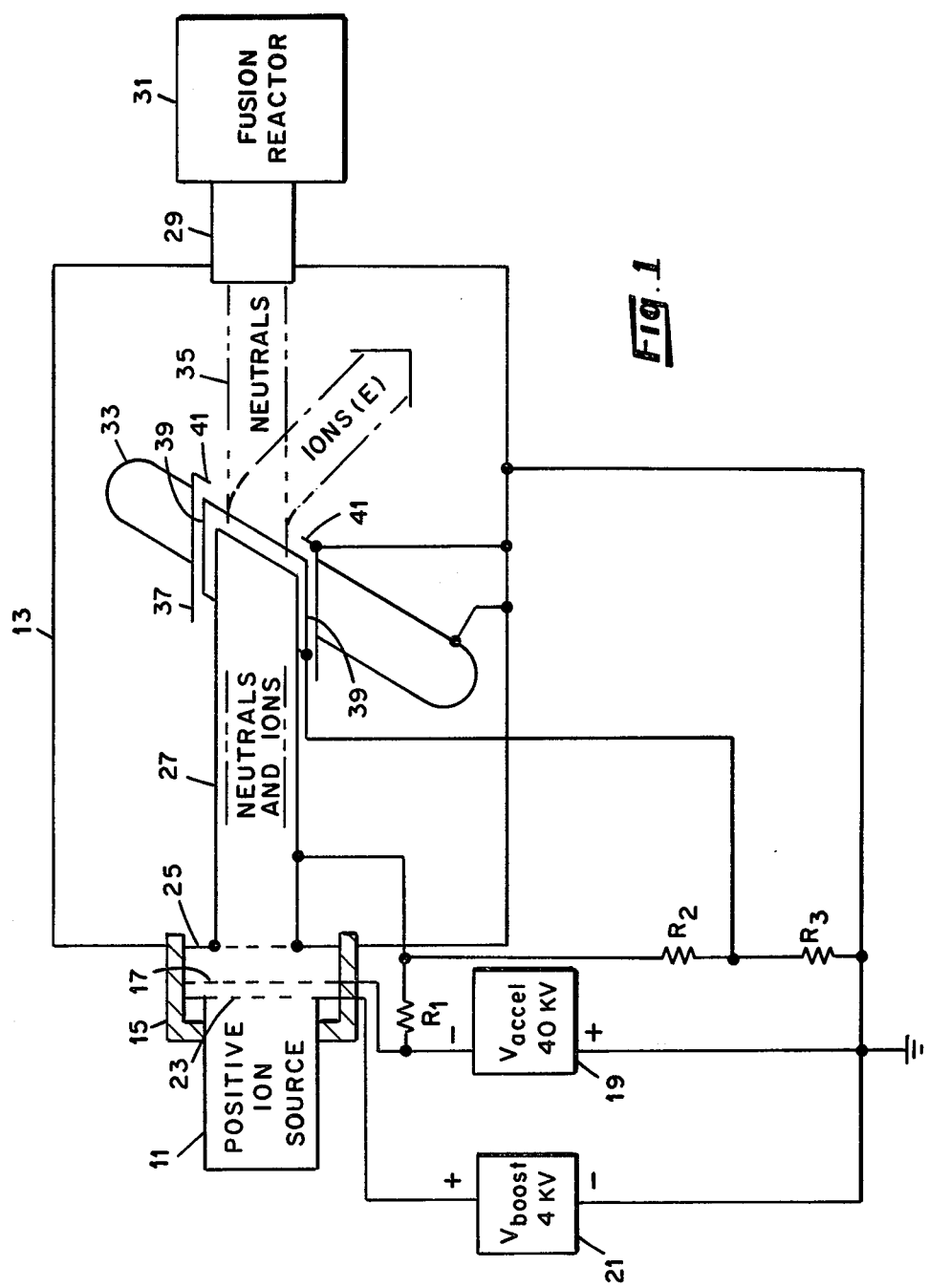
FIG. 1 is a schematic illustration of a neutral beam generator employing direct energy recovery of full energy positive ions based on magnetic blocking of electrons and magnetic and electric field reflection of fractional energy ions in accordance with the present invention.

Referring now to FIG. 1, there is shown schematically a neutral beam system for direct energy recovery of full energy ions (E) in accordance with the principles of the present invention. A light isotopic species positive ion source 11 is operated at essentially ground potential. The ion source may be mounted to a vacuum enclosure 13 for the beamline system by means of an electrical insulator and seal assembly 15. The plasma beam from the source 11 contains the selected species positive ions which are accelerated by means of a $V_{accel}$ power supply 19. The value of the acceleration voltage $V_{accel}$ will depend upon the beam energy requirements and the ion source capacity. For the illustration here $V_{accel}$ is $-40$ kV for a 60 amp ion curren t. This is typical for heating plasmas in the Princeton Large Torus fusion research experiment, for example.

The $V_{accel}$ source 19 is connected between ground and the extraction grid 17 of the source 11 so that the grid is biased negative with respect to ground. A slight boost voltage, ($V_{boost}$) typically 4 kV positive, is applied by means of a power source 21 connected between ground and the plasma grid 23 of the ion source. The exit grid 25 of the ion source 11 is connected electrically to a gas cell neutralizer 27. The gas cell 27 and the exit grid 25 are operated slightly positive relative to the extraction grid 17, typically 1 kV, to prevent electrons generated in the neutralizer cell 27 from drifting back into the ion source 11. This may be accomplished by connecting the negative side of the source 19 to the gas cell 27 through an appropriate size resistor $R_1$. However, here and in the following description a seperate power supply floating on the $V_{accel}$ supply 19 is preferred since the use of resistors for biasing introduces excessive energy loss.

The beam of positive ions extracted from the ion source 11 is thus accelerated to a kinetic energy of about 40 keV and remain at that energy through the neutralizer gas cell 27. In the gas cell, a portion of the ions entering the cell are converted to neutral particles with high kinetic energy and travel along the accelerated beam path and into an evacuated drift tube 29 coupled to a neutral beam utilization device, such as a fusion reactor 31, for example, to heat a magnetically confined plasma.

It will be understood that the beam must be manipulated within a vacuum containment and that it is necessary to remove the background gases and the de-energized species from which the charge has been collected. This is accomplished as in any conventional beamline by cryocondensing vacuum pumping panels or other suitable vacuum pumping means (not shown).

In order to obtain energy recovery from the full energy (E) residual ions which exit the neutralizer cell along with the neutrals, the ions must be deflected from the neutral beam path and electrons must be blocked at the neutralizer exit. If the electrons are allowed to go to one of the ground potential surfaces, they would be accelerated across the dotted path (the ion deceleration potential) as shown in the potential distribution plot of FIG. 2 and would collectively give up more energy than could be recovered from the full energy positive ions.

Figure 3:
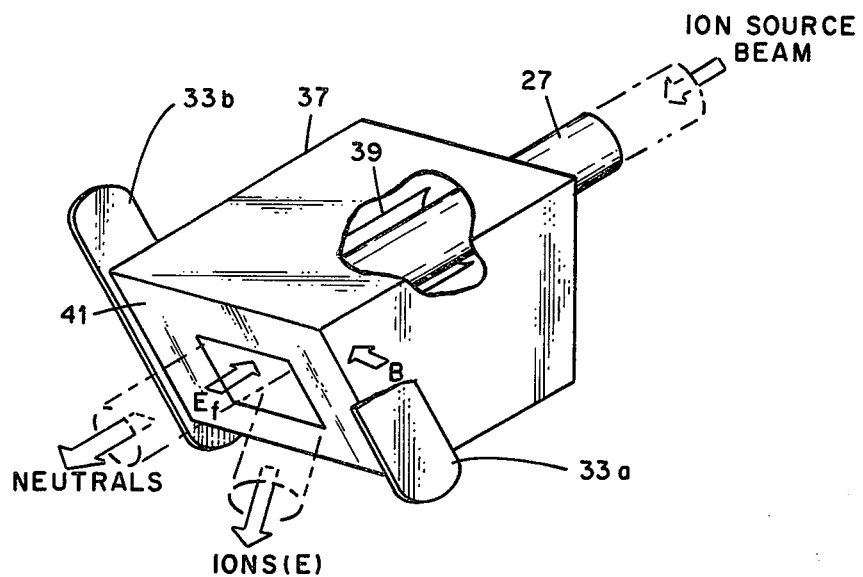
FIG. 3 is a perspective view of the gas neutralizer end structure made in accordance with the teachings of the present invention.

To accomplish electron blocking and ion deflection, a magnetic field is provided transverse to the beam in the exit end of the neutralizer tube 27. Referring now to FIG. 3 in conjunction with FIG. 1, it will be seen that the magnetic field (B) is provided by means of electromagnetic pole pieces 33, composed of pieces 33a and 33b, or equivalent magnetic field-producing means disposed in juxtaposition across the beam path in the exit end region of the neutralizer 27, as shown more specifically in FIG. 3. The magnetic field may be varied to obtain the proper field strength to block the exit of electrons. Also, the magnet pole pieces may be tilted at a 45° angle, as shown in FIG. 1 and FIG. 3, or placed at any convenient angle so long as the neutralizer end portion geometry exit is properly tapered to conform to the magnet alignment.

The full energy ions (E) which have sufficient kinetic energy to reach ground potential are deflected from the neutral beam 34 and exit the open downstream end of the neutralizer cell 27. These full energy ions are immediately decelerated upon leaving the exit end of the neutralizer cell and their charge is collected at ground potential. It will be appreciated that the entire ground potential enclosure 13 may be used for collecting these full energy ions and recovering their energy. The small positive ($V_{boost}$) potential from the power source 21 applied to the ion source plasma grid 23 ensures that the full energy ions deflected from the neutral beam have sufficient potential energy to reach the ground potential collecting surfaces.

In accordance with the present invention, the exit region of the gas cell 27 is modified to provide more efficient energy recovery of the full energy ions. An electron collector shell 39 is fastened around the downstream end of the neutralizer 26 by means of electrical insulators (not shown). The collector 39 is made of an electrically conductive nonmagnetic material, such as copper, and conforms to the downstream end geometry of the neutralizer 27. The collector shell 39 is biased slightly positive with respect to the neutralizer 27 to aid in collecting electrons which are forced to drift by the existing magnetic and electric fields to the outer edges of the neutralizer exit. In this example, the electron collector is biased about +5 kV relative to the neutralizer by connecting the shell 39 to a voltage divider network formed by resistors $R_2$ and $R_3$ connected between the neutralizer 27 and ground potential.

An electrically conductive, nonmagnetic box-like structure 37 is provided which closely surrounds the electron collector 39 and the neutralizer 27 exit region. The downstream end of the box structure 37 is sloped to conform to the neutralizer end geometry and has an opening of sufficient size to allow the neutral beam and the deflected full energy ions (E) to pass out of the neutralizer exit region. The box structure 37 is mounted to the neutralizer by means of insulators (not shown) and is connected to ground potential. This provides a close-coupled ground potential surface to intensify the electric field in the neutralizer exit region. The box structure, especially the transverse downstream end portion 42, produces a strong electric field gradient in conjunction with the 40 kV negative acceleration voltage applied to the neutralizer 27. This field ($E_f$), which is transverse to the magnetic field B, protrudes into the exit end of the neutralizer. Thus, ions exiting the neutralizer are immediately decelerated and deflected by the $E_f \times B$ forces. The fractional energy ions do not have sufficient kinetic energy to escape the exit region and are deflected back into the neutralizer. Any electrons leaking past the neutralizer exit, or generated in the exit region by collision of fractional energy ions on surfaces within the confines of the end box structure, are forced to drift transverse to the magnetic and electric fields toward the electron collector 39. Once in the relatively weak electrical field produced by the positive biased electron collector, the electrons proceed to the collector and do not interfere with the energy recovery of the full energy ions exiting the strong field region.

Figure 4:
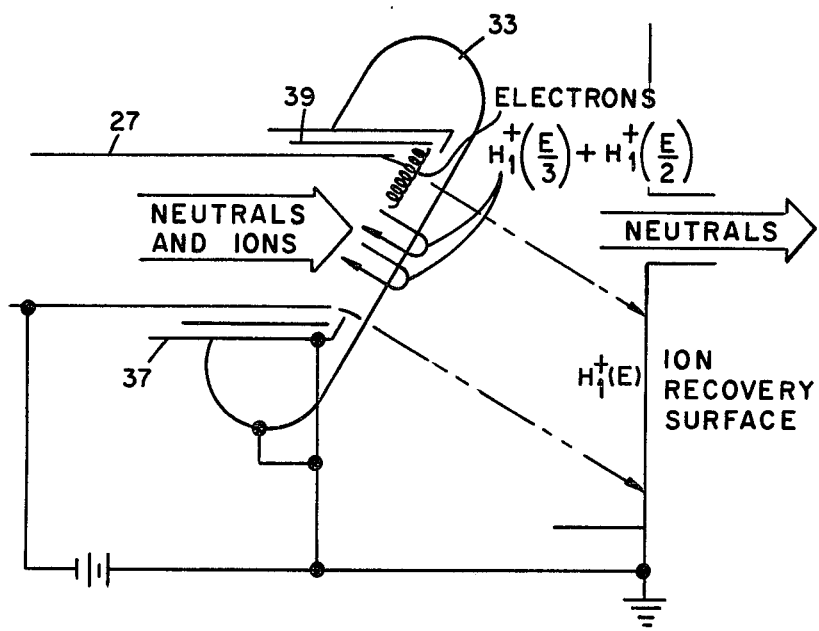
FIG. 4 is a schematic illustration of the different deflection paths for different energy ions exiting the neutralizer cell.

As pointed out above, the residual ions exiting the neutralizer cell 27 into the exit end structure 37 are not all full energy (E) ions but contain fractional energy ions due to molecular ions of the gas species entering the neutralizer from the ion source. In the case of a hydrogen source, as exemplified here, molecular ions ($H_2^+$ and $H_3^+$) extracted from the source 11 along with atomic ions ($H_1^+$) are dissociated into atomic particles as they pass through the neutralizer cell 27. These particles have energy of one-half (E/2) and one-third (E/3), respectively, the original atomic ion acceleration energy (E) and thus cannot reach the ground-potential surfaces on which the full energy ions are collected. Therefore, these ions are deflected and transverse paths with substantially shorter radii than that of the full energy ions. Thus, these fractional energy ions are reflected back into the neutralizer. This is illustrated in FIG. 4. If these ions are allowed to enter the vacuum region outside the neutralizer cell they tend to strike the outer wall of the neutralizer releasing their energy and generating secondary parasitic electrons. Since these electrons would be born at the full energy potential they would be accelerated to a ground-potential surface detracting from the energy recovery. Under a proper range of magnetic field strengths, the lower-energy ions (E/2) and (E/3), are reflected into the inside walls of the neutralizer 27. The full energy ions are deflected from the neutral beam and leave the neutralizer exit region through the open downstream end. Electrons emitted upon the fractional energy ions striking the interior wall of the neutralizer do not detract from energy recovery.

Figure 2:
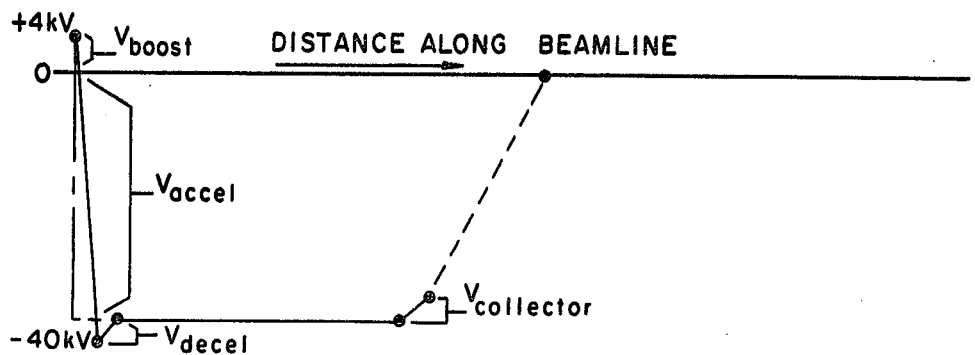
FIG. 2 is a plot of the operating potential of the various components along the beam generator shown in FIG. 1.

In operation, a system electrically biased as shown in FIG. 1 and illustrated in FIG. 2, extracts both atomic and molecular ions from the ion source 11. The ions are accelerated into and through the neutralizer cell 27 where a portion of the ions are neutralized. Electrons streaming toward the exit region formed by the end structure 37 together with the neutral particles, full energy ions and fractional energy ions experience increasing magnetic (B) and electric ($E_f$) fields. Most of the electrons are reflected back into the neutralizer 27 by the strong magnetic field penetrating the exit region structure 37. The full energy ions whose energy is to be recovered are deflected downward and immediately decelerated by the close-coupled magnetic (B) and electric ($E_f$) fields. However, due to their high kinetic energy they escape the end opening of the exit end structure 37. The fractional energy ions are reflected back into an interior wall of the gas cell. Any secondary electrons present within the structure 37 are thus contained within the gas cell exiting region. These electrons are terminated by an upward $E_f \times B$ drift near the cell exit onto the electron collector shell 39. Thus, control of the fractional energy ions is achieved by providing strong, close-coupled magnetic and electric fields in the neutralizer exit region. This also prevents any secondary electrons emitted from interferring with the energy recovery of the full energy ion beam. The geometry of the ground potential structure 37 maximizes the escape of the full energy ions from the neutralizer onto the recovery surfaces, i.e., any ground potential surface. The full energy ions exiting the gas cell are immediately decelerated by the field $E_f$ and their charge is collected on any ground potential surface within the vacuum containment 13.

The energy loss due to the termination of the electrons on the collector 39 is only approximately 5 keV of energy instead of the 40 keV (depending on the value of the $V_{accel}$) they would give up in traveling to one of the grounded surfaces. It should be pointed out that all the vacuum enclosed surfaces beyond the neutralizer exit region are at ground potential including the box end structure 37 and the magnet pole pieces 33. Therefore, the ions coming out of the neutralizer experience retardation due to the primary electric field ($E_f$) while being deflected from the neutral beam within the exit region. When they finally reach the ground potential collecting surface they impart only the energy corresponding to the boost potential (approximately 4 kV in the present example). The boost potential is kept as low as possible and preferably lies between 2% and 10% of the $V_{accel}$ potential from the supply 19. The primary role of the boost voltage ($V_{boost}$) is to ensure that the full energy ions exiting the gas cell have enough energy to reach a ground surface rather than deflect back into the neutralizer cell producing a total energy loss.

Deceleration of the full energy ions (E) to an impact velocity at an energy level equal to the $V_{boost}$ potential returns most of their kinetic energy (corresponding to the $V_{accel}$ potential) to the electrical power supply system used to accelerate them. Thus, their main energy content is recovered, and the ions convert back to low-energy neutral gas to be pumped out of the vacuum chamber as by cryopumping. Secondary electrons generated from the low-kinetic energy impact level of the full energy ions on the ground surface collector do not pose a problem since they are born approximately in the field-free region at ground potential.

As pointed out above, various light isotopic species may be used for the source of ions to be generated depending upon the particular neutral beam application requirements. The full energy ions and neutrals are of primary interest for the purpose of energy recovery since they represent the primary energy component of the beam (85–90%). However, if the fractional energy ions are allowed to exit the neutralizer with the full energy ions they cannot have sufficient energy to reach the ground potential surfaces since the potential drop between the gas cell and their surroundings is almost the full energy potential. These fractional energy ions would strike the outer walls of the neutralizer as pointed out above generating secondary electrons which would be immediately accelerated to the ground potential surfaces detracting from the energy recovery of the full energy ion component. Thus, by confining the fractional energy ions to within the neutralizer cell they cannot interfere with the energy recovery of the full energy ions.

Thus, it will be seen that an improved charged particle energy recovery system for a neutral beam generator based on magnetic blocking of electrons from the neutralizer cell is provided. The electrons are blocked in the exit region while the residual ions are deflected from the neutral beamline so that the full energy ions exit the neutralizer and fractional energy ions are reflected back into the neutralizer. Electrons which leak through the magnetic blocking force and those generated by secondary emission from the impact of any fractional energy ions within the exit region of the neutralizer are collected to prevent their exiting with the full energy ions, which would detract from the energy recovery of the full energy ion component.

In an experimental system as shown in FIG. 1 and biased as shown in FIG. 2, a recovery efficiency of 70%±20% was achieved. This efficiency value takes into consideration the electron energy loss at the collector 39.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention and various embodiments and with various modifications as are suited to the particular use contemplated. For example, the residual ion energy recovery may be used with a negation ion source with the appropriate changes in accelerating and biasing potentials. It is intended that the scope of the invention be defined by the claims appended hereto.

What is claimed is:

1. In a neutral particle beam injector system wherein a neutral particle beam is generated and directed along a beamline, including a substantially ground-potential-operated ion source from which ions of a selected isotopic species are accelerated to a desired kinetic energy level along said beamline through a neutralizer, said neutralizer being operated at a selected ion acceleration potential relative to said ion source to provide said desired kinetic energy level and wherein a significant portion of said ions are converted into energetic neutral particles together with electrons, full kinetic energy atomic ions and fractional kinetic energy atomic ions derived from molecular ions of said selected species accelerated into said neutralizer, an ion energy recovery system including a magnetic field generating means for producing a magnetic field (B) transverse to said beamline in a beam exit region at the beam exit end of said neutralizer and of sufficient strength to substantially block electrons from exiting said neutralizer and deflecting said full energy ions from said beamline along a separate path, and at least one ground potential full energy ion charge collector surface disposed in the path of said full energy ions deflected from said beamline for collecting the charge from said full energy ions directed to said ion collector, the improvement in said ion energy recovery system comprising;

an electrically conductive, nonmagnetic, ground potential operated box-like structure surrounding a portion of said beam exit end of said neutralizer and insulatably spaced from said neutralizer, said box-like structure having a downstream end surface disposed transverse to said beam exit end of said neutralizer, said end surface of said box-like structure having an opening in a central region thereof for restricted passage of said neutral particle beam and said full energy ions from said exit region of said neutralizer so that the rmaining downstream end surface of said box-like structure produces a strong electric field gradient ($E_f$) in conjunction with the accelerating voltage applied to said neutralizer which is transverse to said magnetic field (B), thereby forcing said fractional energy ions to be deflected back into said neutralizer and forcing any electrons in said beam exit region between said neutralizer and said end surface of said box-like structure to drift in a direction perpendicular to said electric field ($E_f$) and said magnetic field (B) within said box-like structure; and an electron collector disposed within said box-like structure, said electron collector surrounding and extending past said exit end of said neutralizer into the drift path of said electrons, said electron collector being disposed in an insulatably spaced relation to said neutralizer and said box-like structure and biased sufficiently positive with respect to said neutralizer to collect said electrons forced to drift toward said electron collector.

2. The improved system as set forth in claim 1 wherein said ion source is a positive ion source and further including a power source connected between said neutralizer and ground potential for applying a negative acceleration voltage to said neutralizer relative to said ground potential operated ion source.

3. The improved system as set forth in claim 2 wherein said ion source further includes means for applying a positive boost acceleration voltage to said ion source relative to ground potential, said boost voltage having an amplitude of less than 10% of the amplitude of said acceleration voltage to ensure that said deflected full energy ions exiting said neutralizer have sufficient kinetic energy to reach said at least one ground potential ion collector surface.

4. The improved system as set forth in claim 3 wherein said neutral beam injector includes an electrically conductive vacuum containment vessel enclosing said beamline therein, said vessel having a beam exit drift tube adapted for passage of said energetic neutral particle beam exiting said vessel, said vessel being connected to ground potential and comprises one of said at least one ground potential ion collector surfaces.

5. The improved system as set forth in claim 1 wherein said exit end of said neutralizer is terminated at an angle with respect to said beamline and said downstream end surface of said box-like structure is disposed at the same agle as said exit end of said neutralizer relative to said beamline to maximize the escape of said full energy ions from said exit region at said exit end of said neutralizer and wherein said magnetic field generating means includes first and second magnet pole pieces disposed on opposite sides of said exit end of said neutralizer, outside of said box-like structure and aligned at said angle of said exit end of said neutralizer to provide a uniform magnetic field (B) across the exit region of said neutralizer.

* * * * *